United States Patent

Molitor

[11] Patent Number: 5,827,567
[45] Date of Patent: Oct. 27, 1998

[54] GAME BALL MOLD PREPARATION TECHNIQUE AND COATING SYSTEM

[76] Inventor: John Peter Molitor, 86 Main St., Hatfield, Mass. 01038

[21] Appl. No.: 753,674

[22] Filed: Nov. 27, 1996

[51] Int. Cl.[6] .............................. B05D 3/12; B05D 5/08; B05D 1/36
[52] U.S. Cl. .................... 427/135; 427/142; 427/327; 427/405; 427/409; 428/421; 428/461
[58] Field of Search .................................. 427/135, 327, 427/328, 142, 156, 409, 405; 428/421, 461, 35.9

[56] References Cited

U.S. PATENT DOCUMENTS

| 3,139,352 | 6/1964 | Coyner | 117/5.5 |
|---|---|---|---|
| 3,761,047 | 9/1973 | Mao | 249/115 |
| 3,765,923 | 10/1973 | Bender-Christensen | 427/290 |
| 3,925,530 | 12/1975 | Rees | 264/297 |
| 3,930,071 | 12/1975 | Rao et al. | 427/405 |
| 3,982,983 | 9/1976 | Abraham et al. | 427/209 |
| 4,073,981 | 2/1978 | Baron | 427/259 |
| 4,120,930 | 10/1978 | Lemelson | 427/133 |
| 4,321,177 | 3/1982 | Wilkinson | 427/421 |
| 4,425,411 | 1/1984 | Textor et al. | 427/135 |
| 4,478,779 | 10/1984 | Russell et al. | 264/319 |
| 4,533,568 | 8/1985 | McClinton et la. | 427/135 |
| 4,581,913 | 4/1986 | Reed | 72/53 |
| 4,592,930 | 6/1986 | Schmidt et al. | 427/133 |
| 4,656,049 | 4/1987 | Noto | 427/10 |
| 4,787,638 | 11/1988 | Kobayash | 273/232 |
| 4,919,388 | 4/1990 | Koike et al. | 427/135 |
| 4,951,392 | 8/1990 | Miihkinen | 427/135 |

(List continued on next page.)

OTHER PUBLICATIONS

English Abstract for JP 6344353, published Dec. 20, 1994.
English Abstract for JP 7008576, published Jan. 13, 1995.
Sioshansi, P., Ph.D., "Surface Engineering by Ion Implantation" *Precision Metal* (Dec. 1988).
Fifoot, R.E., "Fluoroplastics" *Modern Plastics*, Mid–Oct. Encyclopedia Issue (no year).
"Technological Breakthrough in Permanent Mold Release!" Plas–Tech Coating, Inc. (no date).
Abstract for US 4,558,499, published Dec. 17, 1985.
958–200 Series—Teflon–S Nonstick Finishes, DuPont Co. (Nov. 1984).
Teflon 856–Line FEP Products, DuPont Co. (Jan. 22, 1991).
Dupont Material Safety Data Sheet, "Teflon" FEP Resin Finish—Clear (Dec. 8, 1994).
DuPont Material Safety Data Sheet, "Teflon" Nonstick Finish—Black (May 24, 1995).
5 Major Benefits of the Poly–ond Process, Poly–Plating, Inc. (no date).
Marketing and Promotional Information about "Teflon" Nonstick Finishes, DuPont Co. (no date).
"Teflon"—FEP—PFA—S—TFE Coatings, American Durafilm Co., Inc. (no date).
Water Based Diamondkote Spray Technique Methods, Franklynn Industries, Inc. (no date).
High–Performance Custom Coatings, Donwell Company, Inc. (no date).
Premium "Teflon" Coating System for the Commercial Food Industry, DuPont Co., Inc. (Feb. 6, 1990).

*Primary Examiner*—Diana Dudash

[57] ABSTRACT

Disclosed herein is a method of preparing a game ball mold cavity for application of a coating system. A dual region coating system for a game ball mold and a coating application method also are disclosed. The mold preparation method provides for a longer use of a game ball mold than results when conventional mold preparation techniques are used. The dual region coating system comprises a fluorocarbon polymer in the hemispherical opening of the mold cavity, and a metal, such as nickel, impregnated with a fluorocarbon polymer on the land area. The dual region coating system of the invention is particularly useful for making golf ball cores containing zinc-diacrylate and/or zinc dimethacrylate, as these materials tend to adhere to the walls of a mold cavity.

27 Claims, 2 Drawing Sheets

U.S. PATENT DOCUMENTS

| | | | |
|---|---|---|---|
| 4,956,200 | 9/1990 | Malkowski | 427/135 |
| 5,064,583 | 11/1991 | Dagostino et al. | 427/133 |
| 5,219,608 | 6/1993 | Aoki et al. | 427/133 |
| 5,269,284 | 12/1993 | Pujos et al. | 124/88 |
| 5,296,178 | 3/1994 | Sugihara et al. | 264/130 |
| 5,318,091 | 6/1994 | Pavoni et al. | 427/135 |
| 5,535,980 | 7/1996 | Baumgartner et al. | 106/38.22 |
| 5,543,217 | 8/1996 | Morgan | 428/375 |

GAME BALL MOLD PREPARATION TECHNIQUE AND COATING SYSTEM

BACKGROUND OF THE INVENTION

The present invention relates generally to game ball molds, and more particularly, to a method of preparing a game ball mold cavity for application of a coating system. The invention also relates to a dual region coating system which provide for good release of game ball products while providing a relatively long useful life for a single application of the system.

Solid multi-piece (two or more piece) golf balls typically have a spherical core formed from polybutadiene, zinc diacrylate and/or zinc dimethacrylate, and a peroxide initiator. One-piece golf balls generally have a similar composition. The cores and one-piece balls conveniently can be compression molded at an elevated temperature in a metallic mold having a surface coating of, e.g., polytetrafluoroethylene (PTFE). Such mold coatings provide for good release of the golf ball cores from the molds. A non-stick coating material such as PTFE is required due to the presence of zinc diacrylate and/or zinc dimethacrylate, which have adhesive qualities. However, the drawback of using conventional fluorocarbon polymer coating systems applied in a conventional manner as golf ball mold coatings is that frequent recoating of the mold is required. Thus, it would be useful to develop a mold preparation technique which will provide for a longer useful life of a non-stick coating without reducing the useful life of the mold itself. Furthermore, it would be useful to provide a longer lasting coating for a mold which is used to form zinc diacrylate- and/or zinc dimethacrylate-containing game ball products such as one-piece golf balls and solid cores for game balls.

SUMMARY OF THE INVENTION

An object of the invention is to provide a method of preparing a game ball mold cavity for application of a non-stick coating.

Another object of the invention is to provide a mold coating technique which does not result in excessive wear to the mold cavity itself.

Another object of the invention is to provide a dual region coating system for game ball molds, such as golf ball mold cavities, the coating system having a prolonged useful life.

Another object of the invention is to provide a game ball mold for zinc diacrylate- and zinc dimethacrylate-containing game ball products with good release.

A further object of the invention is to provide a method of coating a game ball mold cavity with a long lasting coating.

Yet another object of the invention is to provide a golf ball mold which is particularly well suited for making golf ball cores and one-piece golf balls.

A further object of the invention is to provide a convenient and economical method for coating golf ball mold cavities.

Other objects of the invention will be in part obvious and in part pointed out more in detail hereafter.

The invention in a preferred form is a method of preparing a used game ball mold cavity for application of a coating. The method comprises the steps of obtaining a metallic game ball mold cavity having a land area and a wall defining a hemispherical opening, pretreating the land area and wall by contacting the mold cavity with an abrasive media until substantially all of any previous coating has been removed, and blasting the land area and wall with aluminum oxide media having a grit of about 180–400 under conditions sufficient to obtain a surface penetration of less than 0.2 mils. The abrasive media used in the pretreating step preferably is steel shot. The abrasive media preferably is applied by shot peening. The game ball mold preferably comprises stainless steel.

Another preferred form of the invention is a method of coating a game ball mold cavity comprising the steps of obtaining a metallic game ball mold cavity having a land area and a wall defining a hemispherical opening, pretreating the land area and wall by contacting the mold cavity with an abrasive media until substantially all of the prior coating has been removed, blasting the land area and wall with aluminum oxide media having a grit of about 180–400 under conditions sufficient to obtain a surface penetration of less than 0.2 mils, applying a primer of perfluoroalcoxy resin (PFA) to the land area and wall, and applying a top coat of perfluoroalcoxy resin (PFA) to the land area and the wall. The primer preferably is applied in the thickness of about 0.0003–0.0004 inches. The top coat preferably is applied in the thickness of about 0.0004–0.0006 inches. The abrasive media used in the pre-treating step preferably comprises metal beads and more preferably comprises steel shot with a hardness $\geq 45$ Rockwell C.

Another preferred form of the invention is a coating system for a game ball mold cavity having a land area and a wall defining a hemispherical opening. The system comprises a first coating configured to be coated on the wall of the mold cavity and a second coating configured to be coated on the land area. The first coating comprises a composition which includes at least one fluorocarbon polymer selected from the group consisting of polytetrafluoroethylene (PTFE), fluorinated ethylene polymer (FEP) and perfluoroalcoxy resin (PFA). The second coating comprises a composition of a metal component which is impregnated with PTFE, and which is different than the overall composition of the first coating. The metal component in the second coating preferably is porous, and preferably is nickel and/or chrome. The first coating preferably is nonmetallic, and even more preferably contains both PTFE and FEP.

In a particularly preferred form of the invention, the first coating has a thickness of at least 0.001 5–0.002 inches. The second coating preferably has a thickness of at least 0.0005 0.0010 inches.

Yet another preferred form of the invention is a method of making a coated game ball mold cavity. The method comprises obtaining a game ball mold cavity having a land area and a wall defining a hemispherical opening. A first coating which comprises at least one fluorocarbon polymer selected from the group consisting of PTFE, FEP and PFA is formed on the wall of the cavity. A second coating which comprises a composition of metal and PTFE, and which is of a different overall composition than the first coating is formed on the land area of the mold.

In a particularly preferred form of the invention, the land area is masked while the first coating is applied to the wall of the mold cavity.

The invention accordingly comprises the several steps and the relation of one or more of such steps with respect to each of the others and the article possessing the features, properties, and the relation of elements exemplified in the following detailed disclosure.

DETAILED DESCRIPTION OF THE INVENTION

As indicated above, the invention relates to a mold preparation technique, and to a new and useful dual region coating system. The mold preparation technique provides game ball mold cavities with a long useful life. The mold preparation technique of the invention can be used to prepare a mold cavity for application of a uniform fluorocarbon polymer coating system over both the hemispherical walls and land areas of the mold, and also can be used to prepare molds in which the hemispherical walls and land areas will be coated with different compositions.

The dual region coating system of the present invention achieves a synergistic result because of the differences in the nature of the coatings applied in the hemispherical openings and on the land areas of a mold cavity. The dual coating system results in a long useful life for a single coating application with good release of zinc diacrylate- and zinc dimethacrylate-containing game ball products such as golf ball cores and one-piece golf balls.

Figure 1:
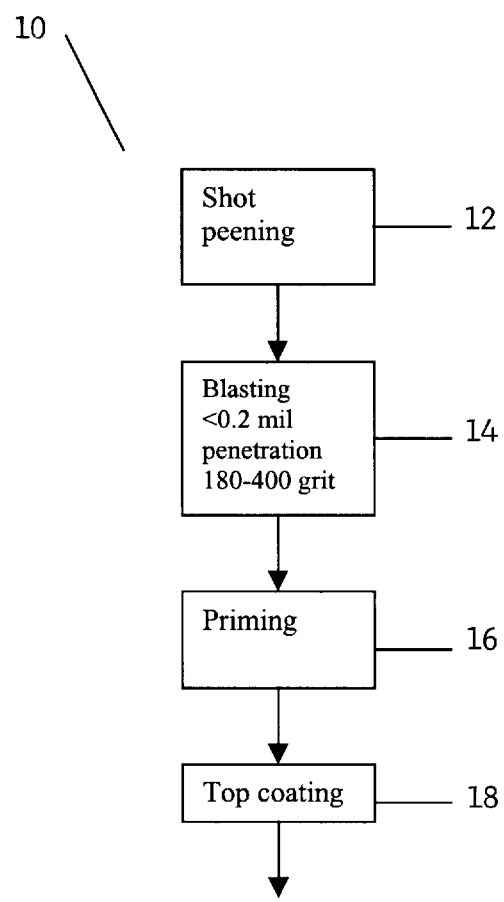
FIG. 1 is a flow chart showing the mold preparation technique of the invention.

Referring now to FIG. 1, a flow chart of the mold preparation technique according to the invention is shown and is designated as 10.

In the first step, the hemispherical opening and the land area of the mold cavity, which typically is made of stainless steel but also can be made of carbon steel or aluminum, are shot peened or air blasted with an abrasive media such as metal beads, hard plastic particles or the like in a shot peening zone 12. One preferred abrasive media is Guyson Metal Bead #900042. This step removes most of any prior coating off of the mold surfaces. Subsequently, the hemispherical opening and land area of the mold cavity are blasted with aluminum oxide powder having a grit of 180–400, more preferably 200–280, in a blasting zone 14. This grit size is substantially smaller than the 70–80 grit powder recommended by current suppliers of mold preparation products. It is important to use a small grit material in order to avoid obtaining too high a penetration depth of the mold surface. A penetration depth greater than 0.01 mils but well below 0.2 mils is preferred.

After blasting, the hemispherical opening and land area of the mold cavity are primed in a priming zone 16 with a PFA primer such as, e.g., Dupont 420-703 or Witford E-8878B. The primer has a preferred (cured) thickness of about 0.3–0.4 mils. The primer can be applied by spraying or another suitable technique. The primer is cured under appropriate conditions, such as heating in an oven at about 430° F. metal temperature for about 10–15 minutes. A top coating of PFA material, such as Dupont 857–210 or Witford E-8878A, is applied over the primer coat in a top coating zone 18 to form a top coat layer with a (cured) thickness of about 0.4–0.6 mils. The top coat can be applied by spraying or another suitable technique. The top coat is then cured under appropriate conditions, for example at 750° F. metal temperature for 10–15 minutes.

As indicated above, another aspect of the invention is a coating system for game ball mold cavities which employs different coating compositions on the hemispherical wall and on the land area of the mold cavities. Molds for making golf ball cores containing polybutadiene and zinc diacrylate and/or zinc dimethacrylate typically are clamshell compression molds made of stainless steel. Compression molding of golf ball cores typically takes place at 280°–350° F. A cylindrical slug of golf ball core material is placed in a spherical clamshell mold cavity, which is then closed such that the spacing between the upper and lower halves of the mold is, e.g., about 0.008 inches. During molding, a small quantity of core material referred to as "flash" extends outward from between the rims of the (nearly) mating hemispherical walls in the mold cavities onto the lands of opposite mold cavities, forming an equatorial ring around the core. Typically, the bulk of this ring of core material is separated from the cores when the cores are removed from the mold. Any remaining flash is removed by brush tumbling. The shear force exerted by the flash on the land areas of the mold cavity during compression molding is extremely high and tends to wear away the coating on the land areas. After the coating on the land areas has begun to wear away, the flash tends to stick to the land areas when the molds are opened after compression molding. As a result, a conventional fluorocarbon polymer-coated stainless steel golf ball core mold cavity having a 0.0005 inch or less thick conventional PTFE coating typically needs to be recoated after an average of 660 uses.

When the improved dual region coating system of the present invention is used, the metal coating impregnated with fluorocarbon polymer which is formed on the land areas of the mold cavity provides the land areas with improved durability and abrasion resistance and thus the mold requires less frequent recoating than when conventional coating systems are used.

To form the coating on the land areas, a metal preferably is plated on the land area and subsequently is impregnated with a fluorocarbon polymer. The metal preferably is a porous metal, and more preferably is electroless nickel, chrome plate, or the like. Nickel has been found to be particularly useful because of its porosity.

The coating used on the second region of the mold, e.g. the walls of the cavities, preferably is FEP, PTFE, PFA, or the like. FEP top coatings have been found particularly advantageous due to their very low surface tension. The coating in the cavities preferably has an overall thickness of at least 0.0015 inches, and more preferably is about 0.0018–0.002 inches thick. This provides for good release and strong adhesion of the coating to the mold upon application. Preferably this overall coating includes a 0.0004–0.0008 inch thick primer layer of PTFE and two top coat layers of FEP each having a thickness of about 0.0006 inches or less.

The coating on the land areas of the mold preferably has a thickness in the range of 0.0005–0.0010 inches, and more preferably 0.0005 inches. This range of thickness provides a coating which has good adhesion and a relatively long useful life.

Figure 2:
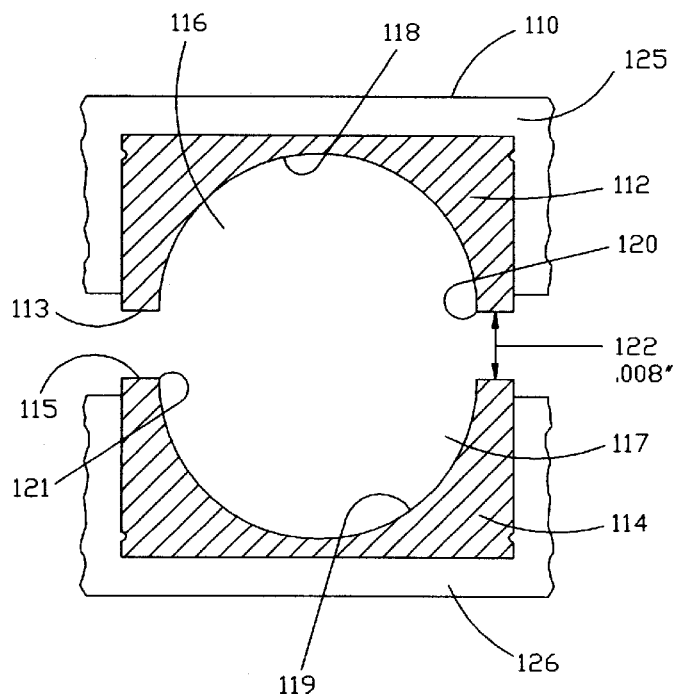
FIG. 2 shows a side elevational view of a section of a golf ball mold which is coated in accordance with one embodiment of the dual region coating system of the present invention.
Figure 3:
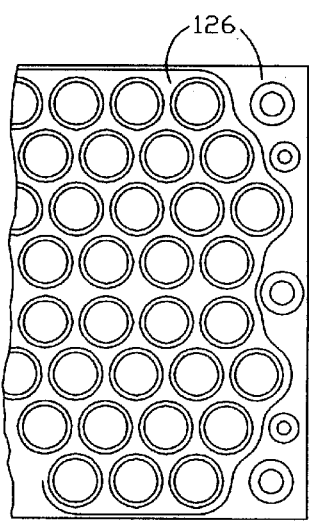
FIG. 3 is a partial top view of the lower half of a golf ball core mold.

Referring now to FIG. 2, a section of a coated game ball mold 110 and a method of coating a game ball mold according to the invention are depicted. An uncoated game ball mold is obtained. The mold has an upper mold half 112 and a substantially identical lower mold half 114. Each upper mold half 112 includes a plurality of mold cavities 116, each of which includes a hemispherical inner wall 118, a circular rim 120, and a ring-shaped land area 113. The mold cavities 116 are mounted in a mold frame 125. Each lower mold half 114 includes a plurality of mold cavities 117, each of which includes a hemispherical inner wall 119, a circular rim 121, and a ring-shaped land area 115. The mold cavities 117 are mounted in a mold frame 126, which is shown in both FIG. 2 and FIG. 3. Adjacent upper and lower inner walls 118 and 119 form a spherical mold for a golf ball core or the like. When the mold is closed, the land areas of the upper and lower mold halves 112, 114 are separated by a distance of, e.g., about 0.08 inches, forming a gap 122, which is shown in an exaggerated form in FIG. 2. The mold 110 is made of stainless steel. The upper and lower halves 112, 114 are moved together and apart by conventional means, which are not shown.

In order to coat the cavities with the dual region coating system, the mold cavities 116, 117 are removed from the mold frames 125, 126. If the mold cavities have been used previously, they are cleaned in order to remove the prior coating. The land areas 113, 115 of the mold cavities 116, 117 are masked using any suitable means, such as metal mask or tape. The inner walls 118, 119 of the hemispherical mold cavities 116, 117 are lightly abraded using 180–400 grit aluminum oxide. A primer coating preferably comprising PTFE is applied to the inner walls 118, 119 in a thickness of 0.0005 inches, and is cured under suitable curing conditions. Subsequently, a first top coat of FEP is applied over the primer coating and cured, preferably followed by at least one more top coat of FEP. One preferred fluorocarbon polymer coating system for the inner walls 118, 119 of mold cavities 116, 117 is a base coat of Dupont 958-203 Teflon-S (PTFE) followed by two top coats of Dupont 856-200 FEP, each of which is separately cured.

After the third coat has been placed on the inner walls 118, 119 and has been cured, the land areas 113, 115 of the mold cavities 116, 117 are unmasked. The land areas 113, 115 of the mold cavities 116, 117 are then placed in a nickel plating solution in order to plate nickel thereon. It is not necessary to mask the inner walls 118, 119 because the non-stick coating on the inner walls 118, 119 prevents the plating of nickel thereon. After plating is complete, the land areas 113, 115 are impregnated with PTFE. The mold is then ready for use. A particularly preferred nickel plating-PTFE impregnation process is that of Poly-Ond® (Poly-Plating Inc., Chicopee Mass).

The mold frames 125, 126 preferably are coated in the same manner as the inner walls 118, 119. Thus, one coat of PTFE primer, followed by two top coats of FEP, preferably are applied.

Having generally described the invention, the following examples are included for purposes of illustration so that the invention may be more readily understood and are in no way intended to limit the scope of the invention unless otherwise specifically indicated.

EXAMPLE 1

GAME BALL MOLD PREPARATION AND APPLICATION OF UNIFORM COATING

A used golf ball core mold was obtained having mold cavities made of 416 stainless steel and mold frames made of 4140 stainless steel. In order to remove the remaining portion of an earlier coating and to prepare the mold cavity surfaces for application of a new coating, the hemispherical walls and land areas of the mold cavities were shot peened with metal bead abrasive media (Metal Bead #900042, Guyson Corp.) at a rate of 440 lbs/min for 10 minutes. Subsequently, the hemispherical walls and land areas of the mold cavities were blasted with 240 grit aluminum oxide media (Dawson-McDonald) in an aluminum oxide blasting machine EQ no. MC-03 (Empire Abrasive Equipment Co.). Before blasting, any remaining golf ball core residue was scraped from the mold cavities. The mold cavities were blasted to a penetration depth of less than 0.2 mils.

Next, the mold cavities were preheated to 120°–180° F. The hemispherical walls and land areas of the preheated mold cavities were sprayed with Dupont 420-703 PFA primer. About 18 to 20 grams of the primer was applied to a heated set of mold cavities, the set of mold cavities including hemispheres for 90 golf ball cores. Spraying was conducted using a Binks model 95 spray gun with a 63 PB air cap and a 63 B SS fluid nozzle (Chicago,). The primer was cured at 430° F. metal temperature for 15 minutes, resulting in a cured coating having a thickness of 0.0003–0.0005 inches. The same type of Binks spray gun, air cap and fluid nozzle were then used to apply a Dupont 857-219 PFA top coat to the hemispherical walls and land areas of the mold. 48–50 grams of topcoat were applied to the primed, cured mold half which was at a mold temperature of 100°–200° F. The top coated mold was cured at 750° F. metal temperature for 15 minutes, and resulted in a cured top coat having a thickness of 0.0004–0.0006 inches.

When more than one truck of mold cavities is cured at once, the curing temperature for curing the top coat can be increased to 770° F.

The mating surfaces of the mold frames 125, 126 were pre-treated, blasted and coated using the same procedure as was used for the mold cavities.

The molds which were coated according to the process described above were then used to form zinc diacrylate-containing golf ball cores. The molds lasted for 990 cycles before recoating was required.

EXAMPLE 2

APPLICATION OF DUAL COATING SYSTEM TO GAME BALL MOLD

A golf ball core mold with new mold cavities made of 416 stainless steel and used and cleaned mold frames made of 4140 stainless steel was obtained. The mold cavities were removed from the mold frames. The land area of the mold cavities was masked with tape and the hemispherical walls of the mold cavities were lightly abraded with 240 grit aluminum oxide. A base coat of Dupont 958-203 Teflon-S (which contains tetrafluoroethylene and hexafluoropropylene) was applied to the hemispherical walls of the cavities in a (cured) thickness of about 0.0006 inches and was cured at 400° F. metal temperature for 15 minutes. Two top coats of Dupont 856–200 FEP each having a (cured) thickness of about 0.0005–0.0007 inches were applied to the hemispherical walls, and the mold cavities were cured for 15 minutes at 700° F. metal temperature after the application of each coating. The cured thickness of the three-layer coating was 0.0015–0.0020 inches. The land areas of the mold cavities were unmasked. The mold cavities were then sent to Poly-Plating Inc., Chicopee, Mass. for application of a coating of nickel impregnated with PTFE on the land areas of the mold cavities in accordance with the Poly-Ond® process. Details of the Poly-Ond®process and the chemistry of the resulting coating are believed to be trade secrets. The mating surfaces of the mold frames were coated by the same process as the hemispherical walls of the mold cavities.

The golf ball mold was used continuously for 1,386 cycles before encountering major sticking problems. This is 210% longer than the 660 cycle useful life of molds coated with a conventional Franklynn-Diamond water-based coat material having a thickness of 0.0005 inches or less.

What is claimed is:

1. A method of preparing a used game ball mold cavity for application of a coating, comprising:

obtaining a metallic game ball mold cavity having land area and a wall defining a hemispherical opening, pretreating the land area and wall by contacting the mold cavity with an abrasive media until substantially all of any previous coating is removed, and blasting the land area and wall with aluminum oxide media having a grit of about 180–400 under conditions sufficient to obtain a surface penetration of less than 0.2 mils.

2. A method according to claim 1, wherein the aluminum oxide media has a grit of about 200–280.

3. A method according to claim 1, wherein the abrasive media used in the pretreating step comprises metal beads.

4. A method according to claim 3, wherein the abrasive media is applied by shot peening.

5. A method according to claim 1, wherein the game ball mold comprises stainless steel.

6. A method according to claim 1, wherein the step of obtaining a metallic game ball mold cavity comprises obtaining a golf ball core mold cavity.

7. A method according to claim 6, wherein the metal comprises nickel.

8. A method of coating a used game ball mold cavity, comprising:

obtaining a metallic game ball mold cavity having a land area and a wall defining a hemispherical opening, pre-treating the land area and wall by contacting the mold cavity with an abrasive media until substantially all of the previous coating is removed, blasting the land area and wall with aluminum oxide media having a grit of about 180–400 under conditions sufficient to obtain a surface penetration of less than 0.2 mils, applying a primer of perfluoroalcoxy resin to the land area and the wall, and applying a top coat of perfluoroalcoxy resin to the land area and the wall.

9. A method according to claim 8, wherein the primer is applied in a thickness of about 0.0003–0.0004 inches.

10. A method according to claim 8, wherein the top coat is applied in a thickness of about 0.0004–0.0006 inches.

11. A method according to claim 9, wherein the top coat is applied in a thickness of about 0.0004–0.0006 inches.

12. A method according to claim 8, wherein the step of obtaining a metallic game ball mold cavity comprises obtaining a golf ball core mold cavity.

13. A coating system for a golf ball core mold cavity having a land area and a wall defining a hemispherical opening, comprising:

a first coating configured to be coated on the wall of the golf ball core mold cavity, the first coating comprising a composition which includes at least one fluorocarbon polymer selected from the group consisting of polytetrafluoroethylene, fluorinated ethylene polymer and perfluoroalcoxy resin, and a second coating configured to be coated on the land area of the golf ball core mold cavity, the second coating comprising a composition of a metal component which is impregnated with polytetrafluoroethylene and which has a different overall composition than the first coating.

14. A coating system according to claim 13, wherein the metal component is porous.

15. A coating system according to claim 13, wherein the metal component in the second coating comprises at least one of nickel and chrome.

16. A coating system according to claim 13, wherein the metal component is nickel.

17. A coating system according to claim 13, wherein the first coating includes polytetrafluoroethylene and fluorinated ethylene polymer.

18. A coating system according to claim 13, wherein the composition of the first coating is not metallic.

19. A coating system according to claim 13, wherein the first coating has a thickness of at least 0.0015–0.0020 inches.

20. A coating system according to claim 13, wherein the second coating has a thickness of at least 0.0005–0.0010 inches.

21. A method of making a coated game ball mold cavity, comprising:

obtaining a game ball mold cavity having a land area and a wall defining a hemispherical opening, forming a first coating on the wall of the mold cavity, the first coating comprising at least one fluorocarbon polymer selected from the group consisting of polytetrafluoroethylene, fluorinated ethylene polymer and perfluoroalcoxy resin, and forming a second coating on the land area of the mold cavity, the second coating comprising a composition containing metal and polytetrafluoroethylene, the second coating having a different composition than the first coating.

22. A method according to claim 21, wherein the first coating has a thickness of at least 0.0015–0.0020 inches.

23. A method according to claim 21, wherein the second coating has a thickness of 0.0005–0.0010 inches.

24. A method according to claim 21, wherein the first coating is non-metallic.

25. A method according to claim 21, wherein the step of forming a first coating includes applying at least two coating layers to the wall of the mold cavity.

26. A method according to claim 21, wherein the step of forming a second coating includes plating the metal on the land area and then impregnating the metal with the fluorocarbon polymer.

27. A method according to claim 26, wherein the metal comprises nickel.

* * * * *